United States Patent [19]

Matsumoto et al.

[11] Patent Number: 4,793,678

[45] Date of Patent: Dec. 27, 1988

[54] FIBER OPTIC POLARIZATION CONTROLLER

[75] Inventors: Takao Matsumoto; Haruo Kano, both of Kanagawa, Japan

[73] Assignee: Nippon Telegraph and Telephone Corporation, Tokyo, Japan

[21] Appl. No.: 864,923

[22] Filed: May 20, 1986

[30] Foreign Application Priority Data

| | | | |
|---|---|---|---|
| May 20, 1985 | [JP] | Japan | 60-107748 |
| Jul. 12, 1985 | [JP] | Japan | 60-152407 |
| Dec. 23, 1985 | [JP] | Japan | 60-289874 |

[51] Int. Cl.$^4$ ............................ G02B 6/26; G02B 6/02; G02B 5/30
[52] U.S. Cl. ............................ 350/96.15; 350/96.20; 350/96.29; 350/400
[58] Field of Search ............... 350/96.15, 96.20, 96.29, 350/96.30, 400, 403, 405

[56] References Cited

U.S. PATENT DOCUMENTS

| | | | |
|---|---|---|---|
| 4,239,333 | 12/1980 | Dakss et al. | 350/96.21 |
| 4,389,090 | 5/1983 | LeFevre | 350/96.29 |
| 4,529,262 | 7/1985 | Ashkin et al. | 350/96.15 |

OTHER PUBLICATIONS

"Polarization Controller Can Maintain Light Polarization in Single Mode Fiber" by Laser Focus, Feb. 1981, pp. 58, 62.
"Polarization Stabilization on Single-Mode Fiber" by Ulrich, Appl. Phys. Lett. 34(11), Dec. 1, 1979.
"Single-Mode Fiber-Optical Polarization Rotator" by Ulrich et al., Appl. Optics, vol. 18, No. 11, Jun. 1, 1979, pp. 1857–1861.
"Single-Polarization Single-Mode Optical Fibers" by Okoshi IEEE J. of QE, vol. QE-17, No. 6, Jun. 1981.
"Polarization in Optical Fibers" by Kaminow, IEEE Journal of QE, vol. QE-17, No. 1, Jan. 1981, pp. 15–22.
"Polarization-Independent Optical Circulator: an Experiment" by Matsumoto et al., Applied Optics/vol. 19, No. 1/Jan. 1980.
Okoshi, Electronics Letters, vol. 21, No. 20, pp. 895–896.
Matsumoto, Electronics Letters, vol. 22, No. 2, pp. 78–79.

Primary Examiner—William L. Sikes
Assistant Examiner—Akm E. Ullah
Attorney, Agent, or Firm—Cushman, Darby & Cushman

[57] ABSTRACT

This invention relates to a fiber optic polarization controller which controls the polarization direction of the light propagating through an optical fiber by curving a single-mode fiber within an imaginary plane S to generate birefringence on the fiber and by rotating the plane S defined with the thus curved portion. The invention aims to prevent twists of the optical fiber which are caused in rotating the plane S by rotating the fiber in one direction from the plane S simultaneously with the rotation of the plane S and correspondingly to the angle thereof. The optical fiber may be rotated either by utilizing the stability of fiber which is held loosely at a curved portion or by forcibly rotating the curved portion from outside.

13 Claims, 16 Drawing Sheets

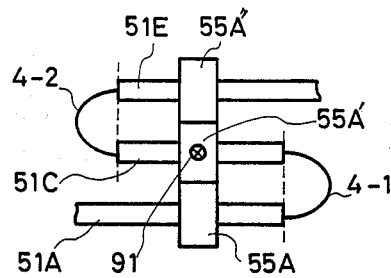
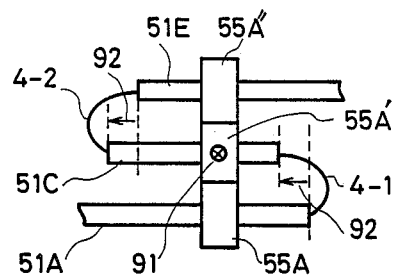
FIG. 9(a)    FIG. 9(b)
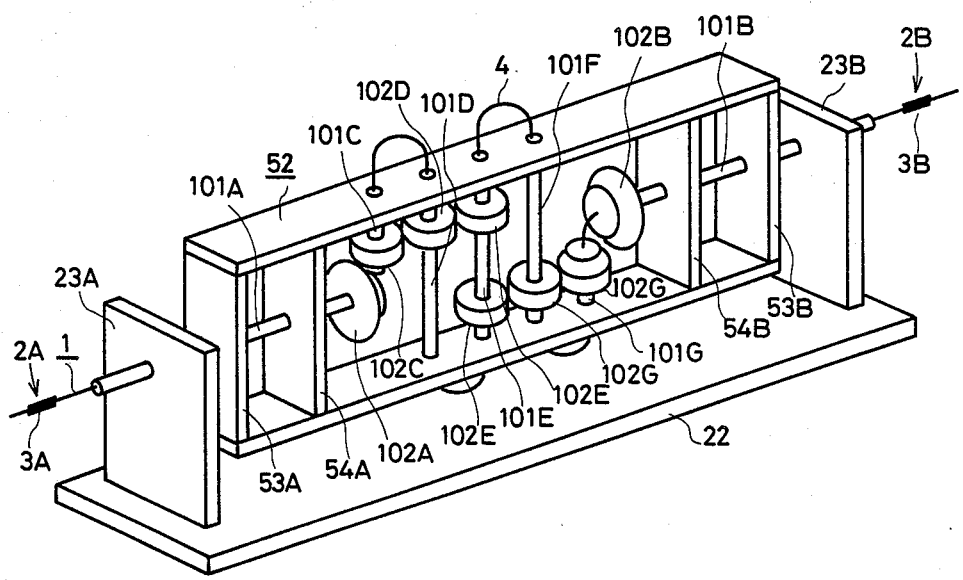
FIG. 10

FIBER OPTIC POLARIZATION CONTROLLER

BACKGROUND OF THE INVENTION

This invention relates to a fiber optic polarization controller which is capable of continuously controlling the polarization state of polarized light propagating through an optical fiber to a desired state.

A polarization controller is one of the indispensable optical devices in such fields as optical communication, optic sensors, optical fiber gyroscopes, optical signal processing, etc. which use single-mode fibers and where polarization of the light propagating therethrough causes a problem. Among various devices, fiber optic polarization controllers are advantageous as they are low in loss, simple in structure and easy in handling.

FIG. 1 shows a structure of a prior art optic fiber polarization controller. The controller was disclosed by H. C. LeFevre in Electronics Letters (9/25/1980) Vol. 16, No. 20 wherein a single-mode fiber 1 is wound on the side of a bobbin 10 to cause a change in refractive index inside the fiber by utilizing an inner stress generated by curvature. As the birefringence principal axis rotates simultaneously with the bobbin 10 as it rotates in the direction R, incident polarized light $P_{in}$ can be controlled to have a desired polarization in outgoing light $P_{out}$. The positions 2A, 2B of input and output sections of an optical fiber 1 are fixed with external fixing means. As the fiber 1 is also fixed on the bobbin 10, the rotation R of the bobbin 10 causes twist at A, B, near the positions 2A, 2B. In order to prevent twist breaking of the optic fiber 1, it is necessary to set a limit on rotation angle of the bobbin 10. It was therefore impossible to realize polarization control function which could continuously follow all the changes in polarization in an optic fiber.

SUMMARY OF THE INVENTION

An object of this invention is to provide a fiber optic polarization controller which can rotate polarization direction endlessly so as to enable continuous follow-up of all the changes in polarization.

Another object of this invention is to provide a device which does not cause twists on optical fibers even if the polarization angle of a single-mode optical fiber is mechanically rotated.

The fiber optic polarization controller according to this invention comprises a curved portion for generating birefringence within a fiber and uses the rotation of a plane S defined with the curved portion just like the prior art fiber optic polarization controllers. The principal of this invention lies in that a single-mode fiber is curved along an imaginary plane S, polarization is controlled with rotation of the plane, and the optical fiber is rotated around the axis of the fiber at the same time. While the optical fiber is fixed in relation to the plane in conventional controllers, the optical fiber according to this invention is rotated in a adequate direction by an angle identical and the opposite direction with the angle of the rotation of said plane S.

Due to such features of the invention, even if said plane S is rotated in one direction by a large angle, no distortion occurs on the fiber thereby preventing cutting-offs by fatigue.

If the curvature of the optical fiber is constructed to allow fine adjustments, the birefringence can be adjusted by an extremely simple operation to provide a desired polarization state. This can relax the manufacturing precision of fiber optic polarization controllers.

BRIEF DESCRIPTION OF THE DRAWINGS

FIG. 9 is an explanatory view of operation.

FIG. 10 is a perspective view of the fifth embodiment of this invention's optic fiber polarization controller.

DETAILED DESCRIPTION OF THE INVENTION

Figure 1:
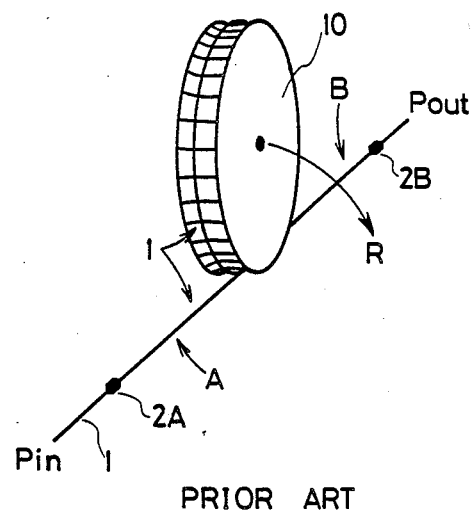
FIG. 1 is a perspective view of a prior art fiber optic polarization controller.
Figure 2:
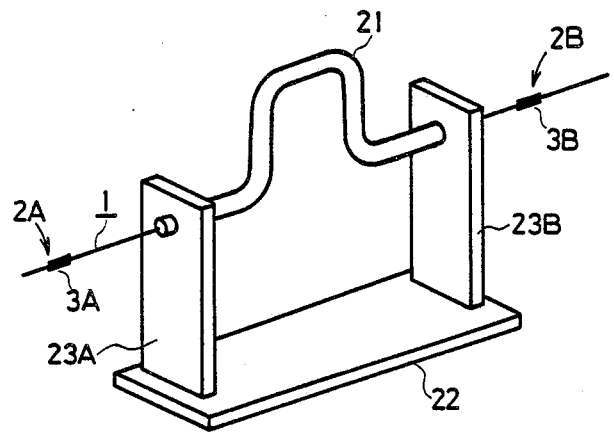
FIG. 2 is a perspective view of the first embodiment of the fiber optic polarization controller of this invention.

FIG. 2 is a perspective view of the first embodiment of a fiber optic polarization controller according to this invention. A single-mode optical fiber 1 is loosely inserted into a tube 21 which is curved on a plane. The tube 21 is supported at both ends thereof by supporting plates 23A, 23B which are attached to a supporting base 22 upright therefrom in a manner freely rotatable around an axis connecting both ends of the tube 21. The optical fiber 1 is fixed with fixing members 3A, 3B at positions 2A, 2B outside the supporting plates 23A, 23B.

Figure 3:
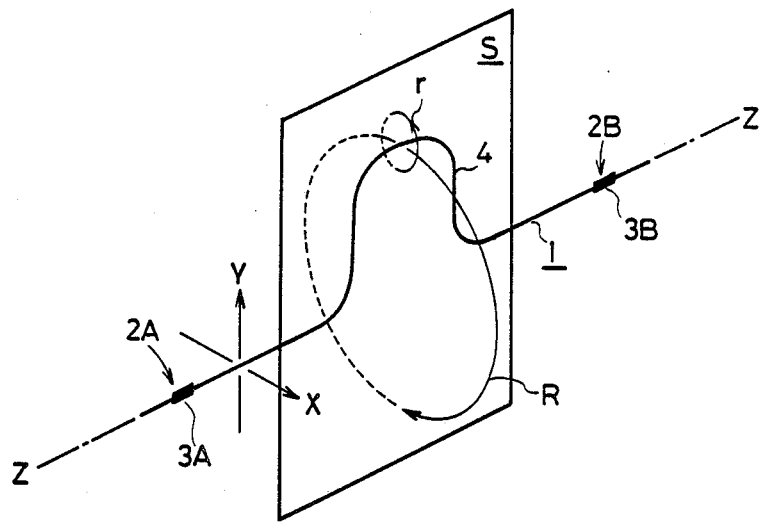
FIG. 3 is a view to show the principle of this invention's optical fiber shape.

FIG. 3 is a view to show the principle of this embodiment wherein an optical fiber 1 is curved at the portion between the positions 2A, 2B or at the curved portion 4 on a plane S. The plane S is rotatable around an axis connecting the positions 2A, 2B or the axis Z—Z. As the curved portion 4 is not fixed to the plane S, when the plane S is rotated in the direction R, the curved portion 4 per se can be rotated in the direction r.

As the plane S rotating in the direction R rotates the principal axis of birefringence, the polarized face of the light going out of the optical fiber 1 changes. As the twist thus caused is reversed in the direction r at the curved portion 4 of the fiber 1, the plane S can be rotated endlessly in the direction R even if the fiber 1 is fixed at the positions 2A, 2B. In other words, the principal axis of the birefringence may be rotated in any direction.

Figure 4:
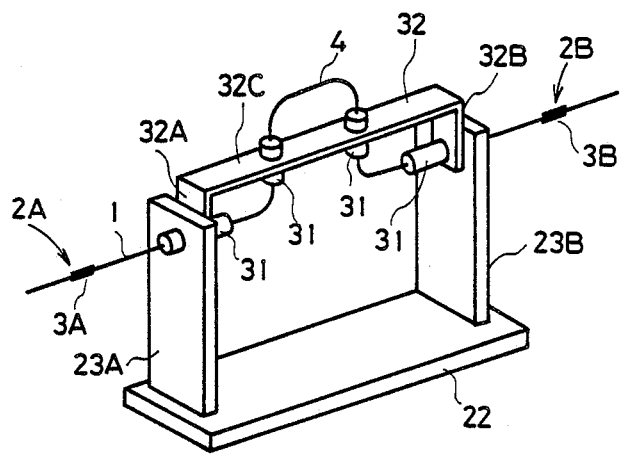
FIG. 4 is a perspective view to show the second embodiment of this invention's fiber optic polarization controller.

FIG. 4 is a perspective view to show the second embodiment of this invention's fiber optic polarization controller. In this embodiment plural tubes 31 from which the portion 21 of the first embodiment is omitted are supported on a frame 32. The tubes 31 include the portion close to the supporting plates 23A, 23B and portions corresponding to the two positions of the curved portion 4 of the fiber 1. The frame 32 includes side plates 32A, 32B on both sides and a central plate 32C. The side plates 32A, 32B are connected to the tubes 31 at locations near the supporting plates 23A, 23B and the central plate 32C supports the tubes 31 at the two positions on the curved portion 4.

The above structure can achieve the same effect in polarization control as the one described in relation to FIG. 3.

Figure 5:
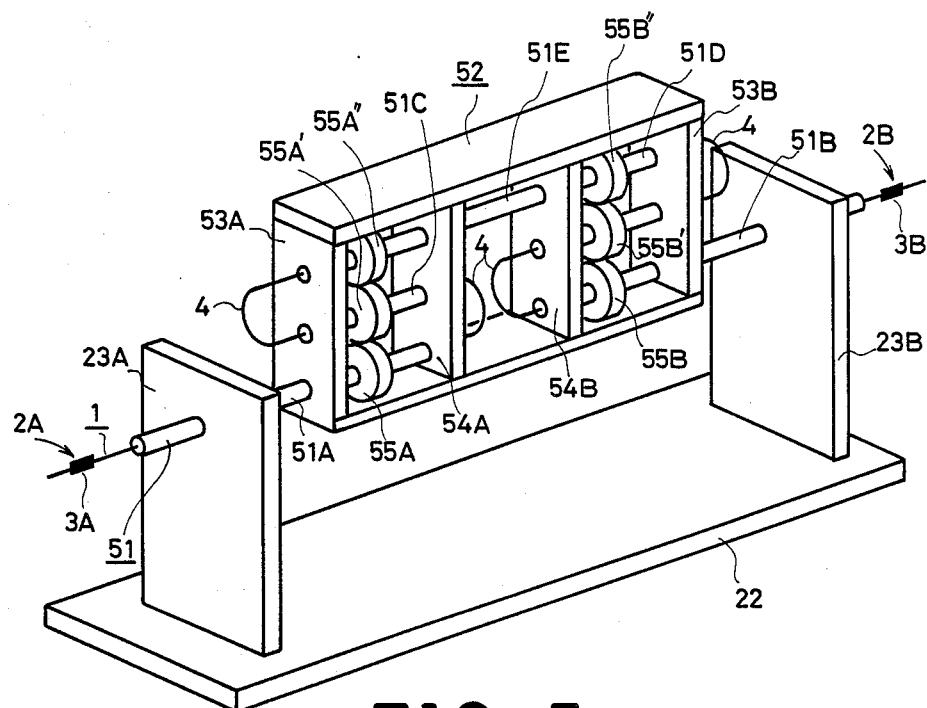
FIG. 5 is a perspective view of the third embodiment of this invention's fiber optic polarization controller.

FIG. 5 is a perspective view to show the third embodiment of this invention's fiber optic polarization controller. This embodiment uses tubes 51A through 51E which are divided into plural sections and are supported loosely with a rectangular frame 52. The frame includes end plates 53A, 53B and partition plates 54A, 54B. The tube 51A is fixed on the supporting plate 23A to penetrate through an end plate 53A at the left side in the figure and a partition plate 54A. The tube 51B is fixed on the supporting plate 23B to penetrate through an end plate 53B and a partition plate 54B. The tube 51C penetrates through the end plate 53A and the partition plate 54A in a freely rotatable manner while the tube 51D penetrates through the end plate 53B and a partition plate 54B in a freely rotatable manner. The tube 51D penetrates through the end plate 53B and the partition plate 54B in a freely rotatable manner. The tube 51E penetrates through the end plate 53A, the partition plates 54A, 54B and an end plate 53B in a freely rotatable manner.

The tubes 51A, 51B are respectively provided with gears 55A, 55B fixedly while the tubes 51C, 51D are respectively provided with gears 55A', 55B' fixedly which are respectively toothed with the gears 55A, 55B. Further, the tube 51E is provided with gears 55A", 55B" respectively which are respectively toothed with the gears 55A', 55B'.

An optical fiber 1 is integrally fixed to have the curved portion 4 thereof penetrate through the tubes 51A through 51E. When the frame 52 is rotated, the curved portion 4 of the optical fiber 1 is forced to rotate. Even if the length of the curved portion 4 is extensive, the fiber 1 will not be twisted.

Figure 6:
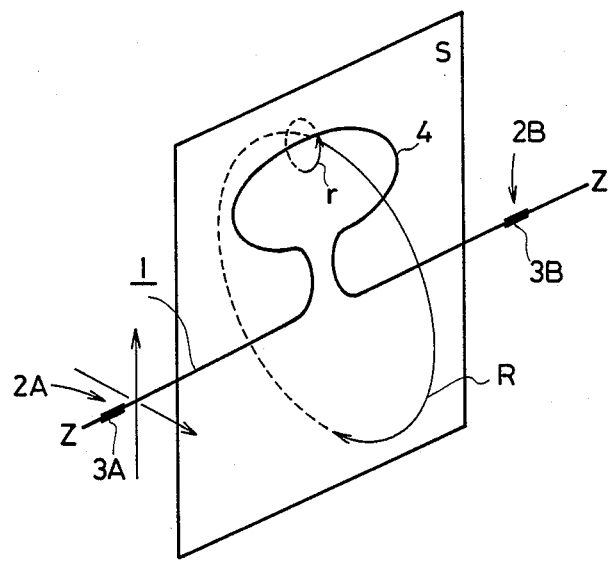
FIG. 6 is a view to show the form of an optical fiber.

FIG. 6 shows the principle of this embodiment. The curvature 4 may be large in this embodiment to conveniently increase birefringence. Other features are similar to those described in relation to FIG. 3.

Figure 7:
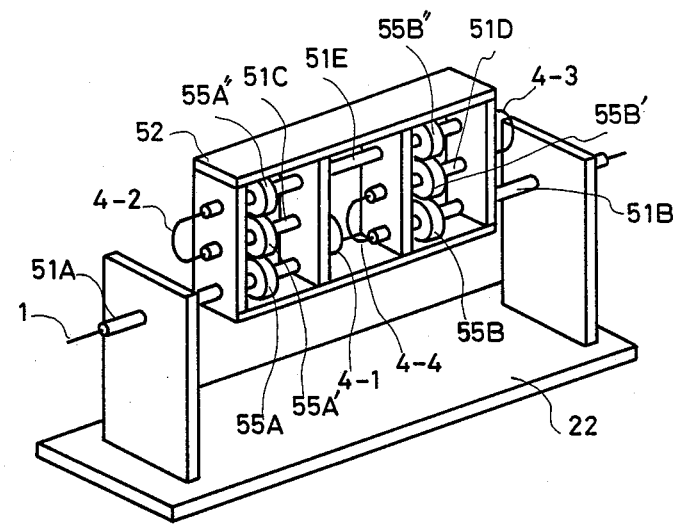
FIG. 7 is a perspective view to show the fourth embodiment of this invention's fiber optic polarization controller.
Figure 8:
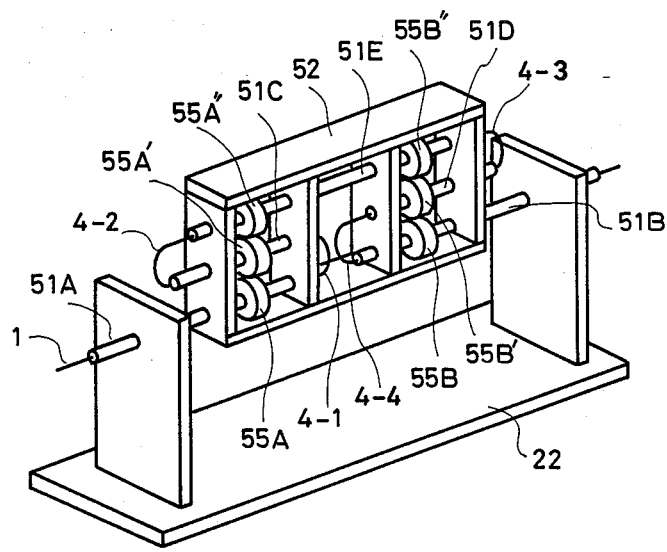
FIG. 8 is a perspective view of fine and minute adjustment.

FIGS. 7 through 9 show the fourth embodiment of this invention's fiber optic polarization controller. FIGS. 7 and 8 are perspective views while FIG. 9 is side view with the portion near the curved portion 4 enlarged.

In the third embodiment, the relative positions among the tubes 51A, 51B, 51C, 51D and 51E and the gears 55A, 55B, 55A', 55B', 55A", 55B" are fixed to make the birefringence of the fiber 1 constant. It is therefore impossible to compensate errors made in design.

In the fourth embodiment shown in FIGS. 7 through 9, the tubes 51C, 51D and the optical fiber fixed therein are structured to be movable axially. The gears 55A', 55B' are attached with screws 91 for fixing tubes 51C, 51D respectively. The tubes 51C, 52D can be moved axially by loosening the screws 91.

FIG. 9(a) is a side view of portions near the curved portion 4 of the optical fiber 1 in enlargement. As the state shown in the figure has not been finely adjusted, the curved portions 4-1, 4-2 of the fiber 1 are semi-circles maintaining given curvatures respectively. The positions of the end faces of the tubes 51A, 51B, 51C which fix the fiber 1 are aligned at the root of the curved portions 4-1, 4-2. The birefringence which is generated by bending the optic fiber 1 is always constant.

FIG. 9(b) is an enlarged view of the optical fiber 1 shown in FIG. 8 and more particularly of the portions near the curved portion 4. In other words, shows a modification of the one shown in FIG. 9(a). The positions of the gears 55A, 55A' and 55A" are not modified, but the tube 51C which fixes the optical fiber 1 is moved in the direction marked with an arrow 92 to change the curvature and shape of the curved portions 4-1, 4-2. This consequently changes the birefringence caused by the curvature of the optical fiber 1 to finely modify the polarization state. The tube 51C can be moved simply by loosening the screw 91.

In the fourth embodiment, extra lengths are provided respectively for the tubes 51C, 51D which extend from the end plates 53A, 53B in order to provide enough space for the movements of the tubes. The tubes 51A, 51B and 51E are extended in correspondence thereto.

Figure 11:
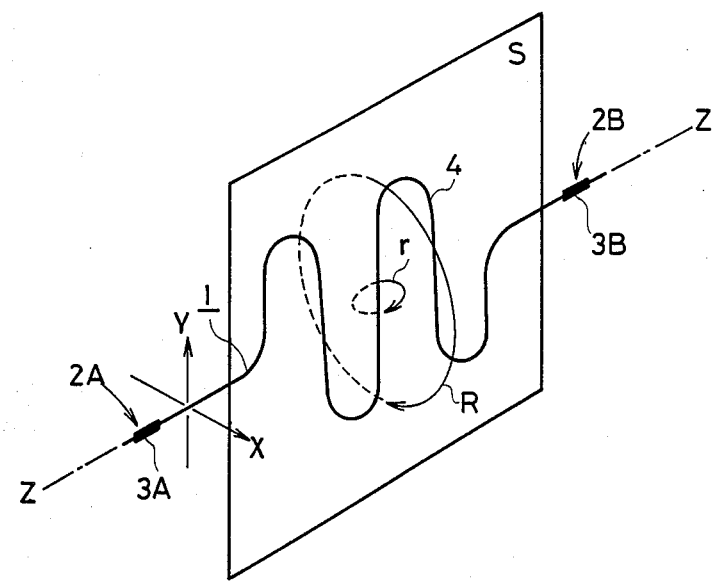
FIG. 11 is a view to show the form of an optical fiber.

FIG. 10 is a perspective view of the fifth embodiment of this invention fiber optic polarization controller, and FIG. 11 shows the shape of an optical fiber 1 therein.

In the fifth embodiment, a frame 52 is provided as in the third and fourth embodiments. Plural tubes 101A through 101G are provided with gears 102A through 102G respectively and a curved portion 4 of an optical fiber 1 is fixed to the tubes 101A through 101G. Similarly to the third and fourth embodiments, the fifth embodiment is structured in such a manner that the curved portion 4 of the fiber 1 is rotated in correspondence with the rotation of the frame 52. This prevents twist which may otherwise be caused on the optical fiber 1 by rotation.

Figure 12:
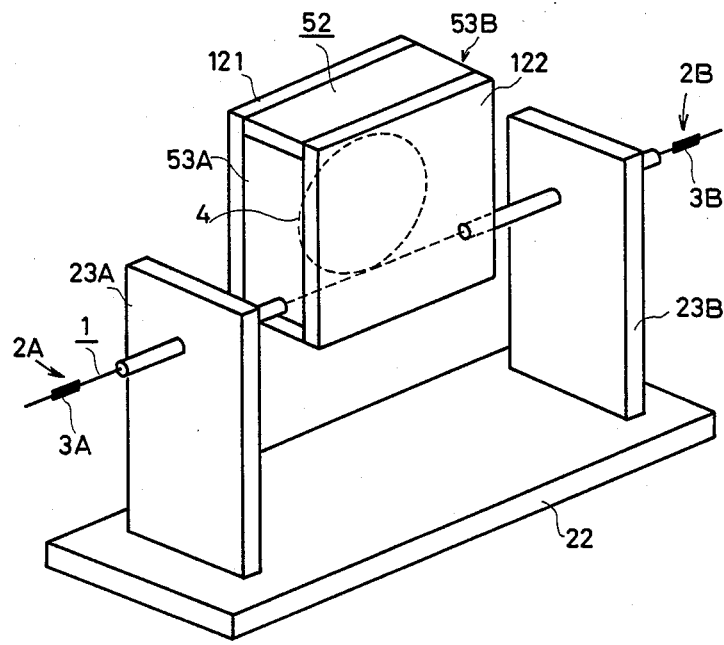
FIG. 12 is a perspective view to show the sixth embodiment of this invention's fiber optic polarization controller.
Figure 13:
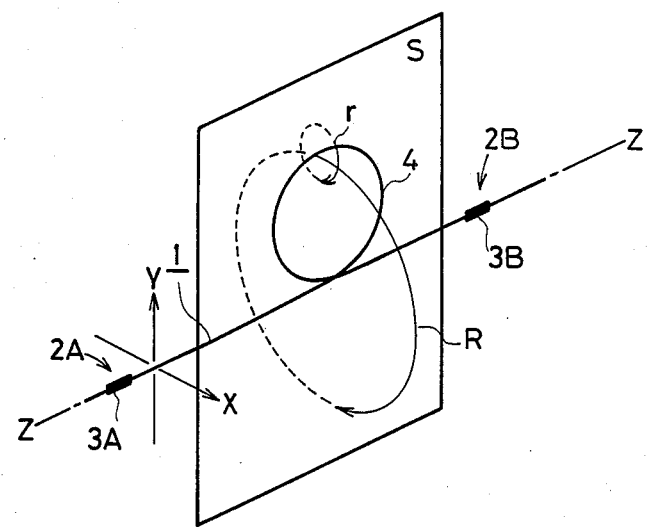
FIG. 13 is a view to show the form of an optical fiber.

FIG. 12 is a perspective of the sixth embodiment of this invention's fiber optic polarization controller, and FIG. 13 shows a shape of the optical fiber thereof.

Similarly to the above embodiments, the sixth embodiment is provided with a frame 52, but the partition plates 54A, 54B therefor are omitted and plates 121, 122 are provided instead at both open sides to close the frame 52. A curved portion 4 of the fiber 1 is housed within a rectangular parallelepiped space defined by the frame 52 and is loosely supported by the plates 121, 122 substantially on a plane. The curved portion 4 is rotated in correspondence with the rotation of the frame 52. The shape of the curved portion 4 may be a simple curve or a coil or a mixture thereof.

Figure 14:
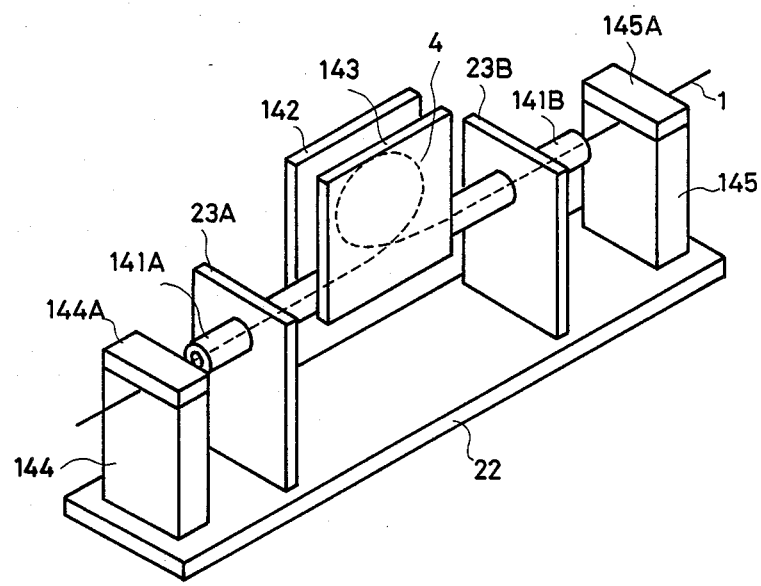
FIG. 14 is a perspective view to show the seventh embodiment of this invention's fiber optic polarization controller.

FIG. 14 is a perspective view of the seventh embodiment of this invention's fiber optic polarization controller. The shape of the optical fiber is identical to the one shown in FIG. 13.

In this embodiment, side plates 142, 143 which are parallel to each other support an optical fiber 1 loosely so that the optical fiber 1 may be rotated in the direction r between the side plates.

The optical fiber 1 is coiled to form a curved portion 4. The optical fiber 1 extends from a point on the curved portion 4 in the direction opposite to the tangent thereof. Tubes 141A, 141B are provided in order to guide the extension of the optical fiber without fixing it. The fiber 1 is loosely held within the tubes 141A, 141B. The tubes 141A, 141B are held on one end thereof between the side plates 142 and 143 to be fixed. The tubes 141A, 141B are held with two opposing support plates 23A, 23B in a freely rotatable manner. The support plates 23A, 23B are held upright on a supporting base 22. The supporting base 22 is provided with fixing portions 144, 145 outside of the support plates 23A, 23B. The extension of the optical fiber 1 is guided from the tubes 141A, 141B to be placed on the fixing portions 144, 145 and held fixedly by the holding pieces 144A, 144B which are attached on the fixing portions 144, 145 in an openable manner.

In the structure described above, when the side plates 142, 143 are rotated in the direction R around the axis of the extension of the optical fiber 1 while maintaining the positional relation between the side plates 142, 143 parallel to each other, the surface S of the curved portion 4 therein is rotated to change the polarization state of the polarized light which is propagating through the optical fiber 1. Although the rotation of the curved portion 4 applies a force to twist the fiber 1, the optical fiber itself rotates around its own axis in the direction r to compensate the twist as the curved portion 4 is held loosely between the side plates 142, 143.

Figure 15:
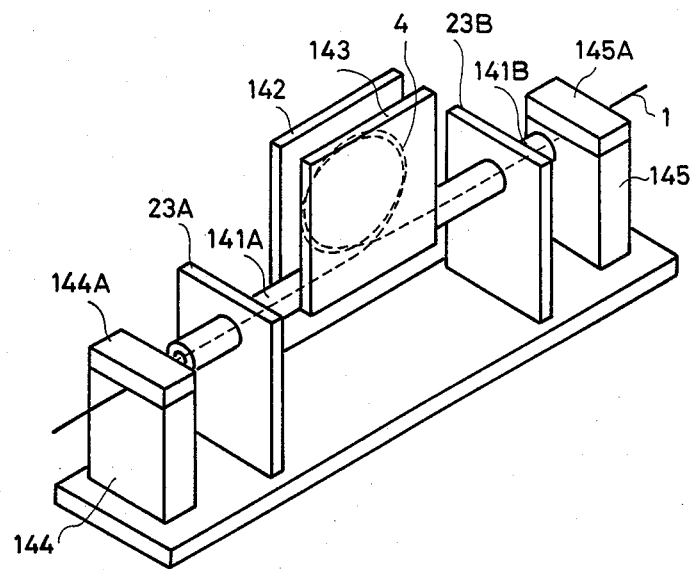
FIG. 15 is a perspective view to show the eighth embodiment of this invention's fiber optic polarization controller.
Figure 16:
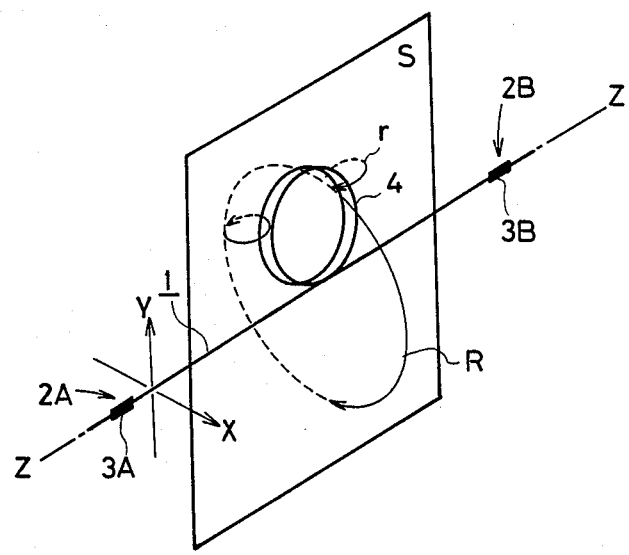
FIG. 16 is a view to show the form of an optical fiber.

FIG. 15 is a perspective view of the eighth embodiment of this invention's fiber optic polarization controller, and FIG. 16 shows a shape of an optical fiber 1 herein. This embodiment is a modification of the one shown in the seventh embodiment with the number of windings of the optical fiber 1 changed to two turns. Even if the number of windings is in plural, the similar effect can be attained.

Figure 17:
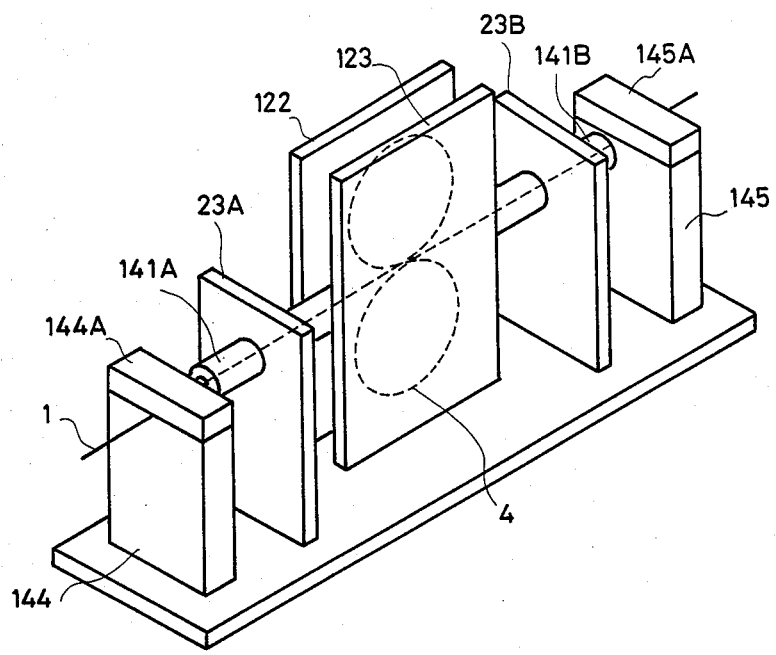
FIG. 17 is a perspective view to show the ninth embodiment of this invention's fiber optic polarization controller.
Figure 18:
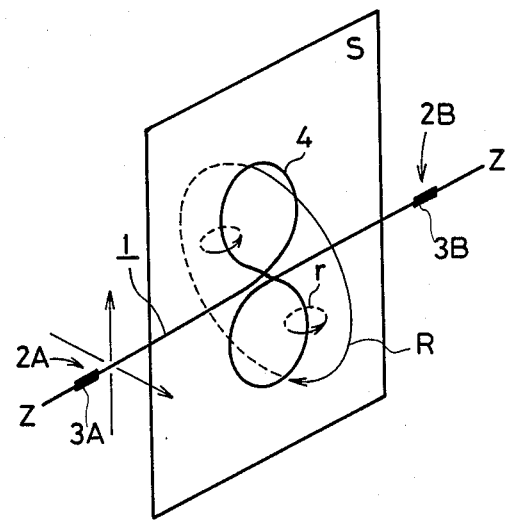
FIG. 18 is a view to show the form of an optical fiber.

FIG. 17 is a perspective view of the ninth embodiment of this invention's fiber optic polarization controller and FIG. 18 shows the shape of an optical fiber therein. In this embodiment, there are provided curved portions 4 in a plural number.

Figure 19:
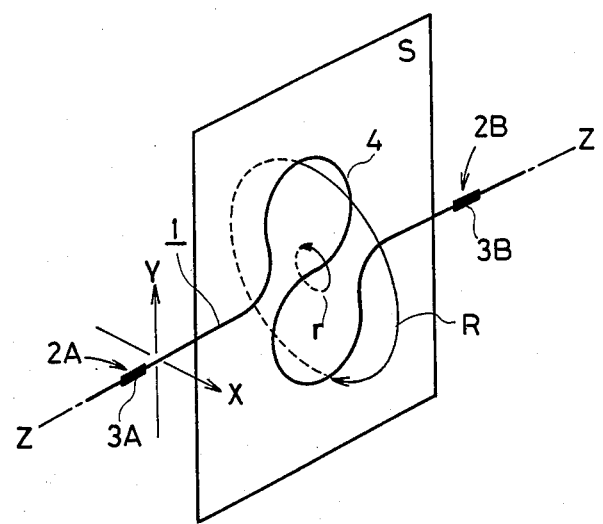
FIG. 19 is a view to show the form of an optical fiber.

Although no specific construction is shown as another embodiment, the shape of an optical fiber may be the one shown in FIG. 19 to achieve the similar effect of this invention. The form and shape of the curved portion 4 may be a simple curve or a coil or the mixture thereof.

Figure 20:
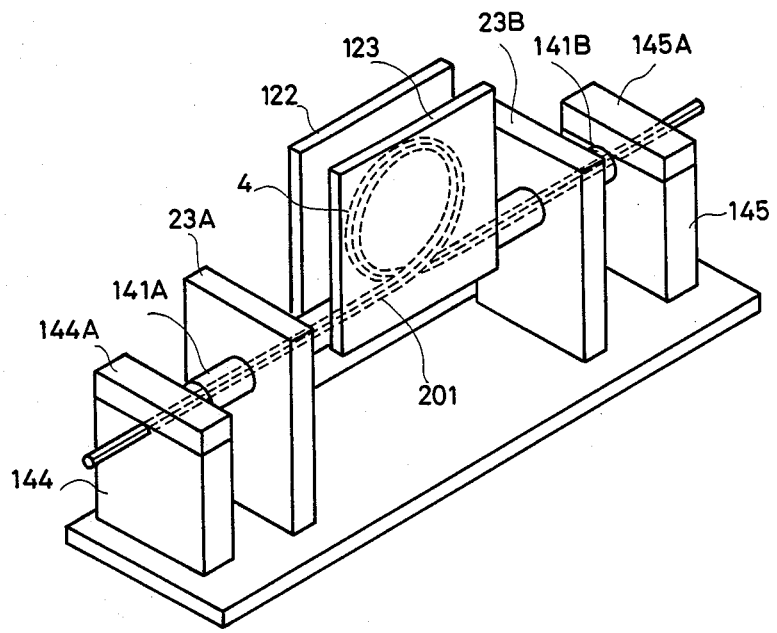
FIG. 20 is a perspective view to show the tenth embodiment of this invention's fiber optic polarization controller.

FIG. 20 is a perspective view of the tenth embodiment of this invention's fiber optic polarization controller. In this embodiment, the optical fiber 1 is coated with one layer or multi-layer of cushion material 201. The coating 201 can reduce the friction between the fiber 1 and the side plates 122, 123 to protect the optical fiber 1, thereby realizing highly safe and reliable device. The inner faces of the side plates 122, 123 and the cladding of the optical fiber 1 are so finished as to give a smooth and sliding effect. An embodiment corresponding to the seventh embodiment in FIG. 14 is shown here, but other embodiments may also be constructed to have the optical fiber cladded.

Figure 21:
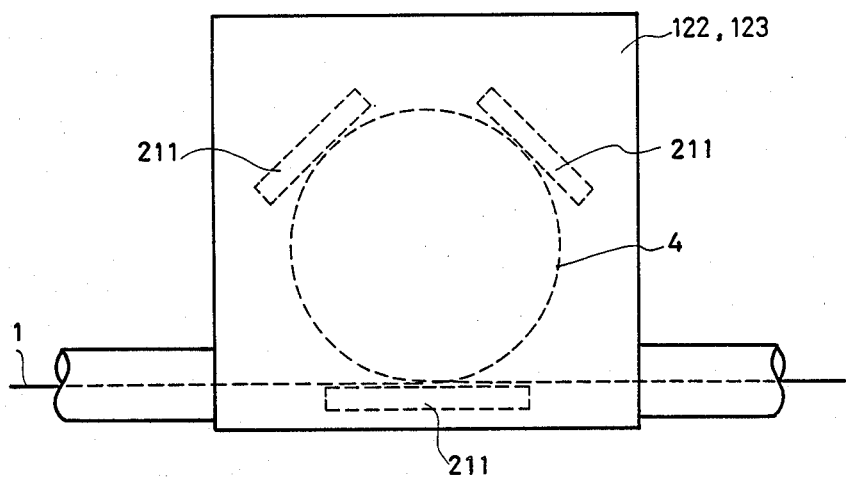
FIG. 21 is a perspective view to show the eleventh embodiment of this invention's fiber optic polarization controller.

FIG. 21 is a perspective view of the eleventh embodiment of this invention's fiber optic polarization controller wherein a supporting piece 211 is provided between the side plates 122, 123 either in contact with or in the vicinity of the outer circumference of the curved portion 4. As the supporting piece 211 stably holds the curved portion 4, a stable and highly reliable device can be achieved.

Figure 22:
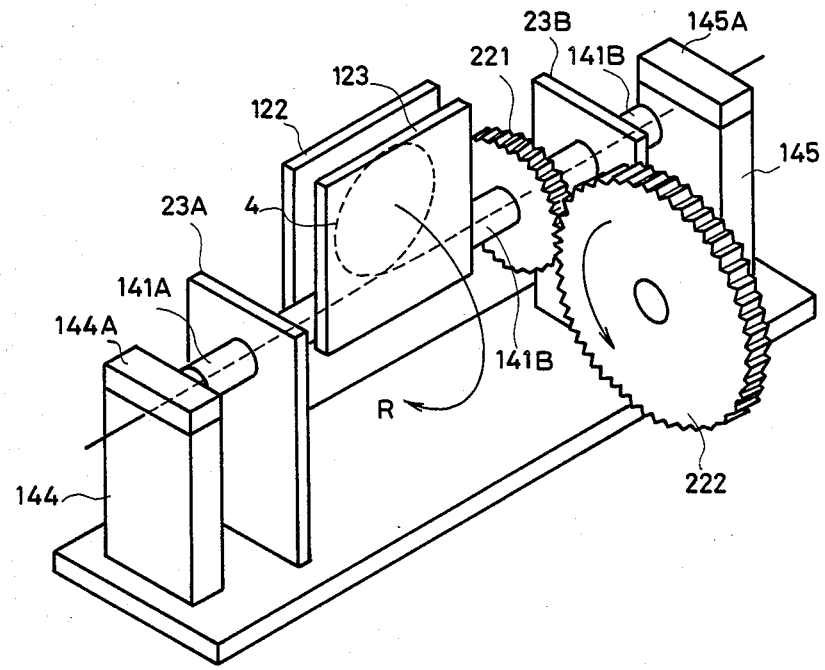
FIG. 22 is a perspective view to show the twelfth embodiment of this invention's fiber optic polarization controller.

FIG. 22 is a perspective view of the twelfth embodiment of this invention's fiber optic polarization controller. In this embodiment, a revolution transfer mechanism is provided to rotate the curved portion 4 of the optical fiber 1 from outside. A gear 221 is fixed on a tube 141B and a gear 222 is provided to be toothed with the gear 221. The side plates 122, 123 and the curved portion 4 may be rotated in the direction R by revolving the gear 22 by, for instance, a motor.

The gears 221, 222 may be replaced with a revolution transfer mechanism comprising pulleys and belts to achieve the effect of this invention.

Figure 23:
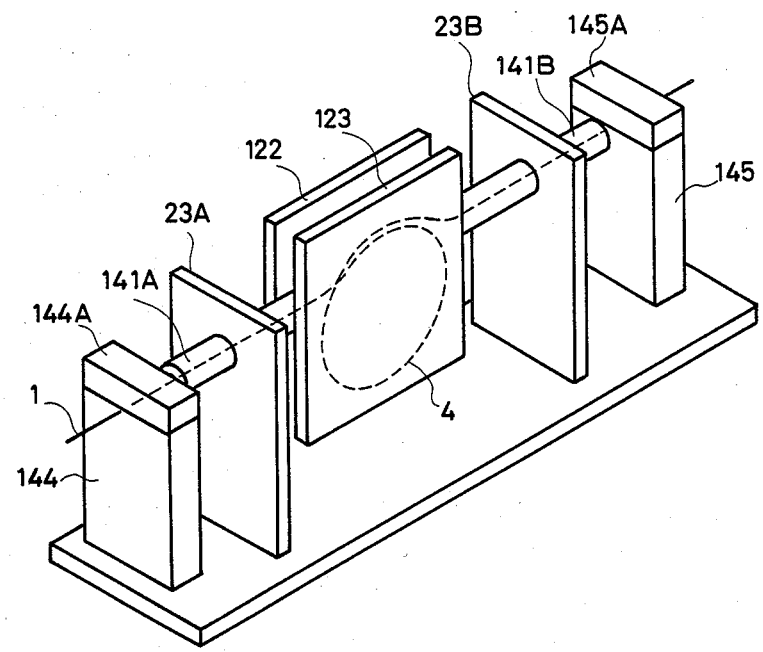
FIG. 23 is a perspective view to show the thirteenth embodiment of this invention's fiber optic polarization controller.

FIG. 23 is a perspective view of the thirteenth embodiment of this invention's fiber optic polarization controller. Although the extension of the optical fiber 1 is led out from one location on the curved portion 4 in the seventh through the twelfth embodiments, it is led from two locations in this embodiment. The optical fiber 1 is directed in the directions of a linear line which crosses the curved portion 4 at two locations to oppose each other and the side plates 122, 123 are structured to be freely rotatable around the linear line.

Figure 24:
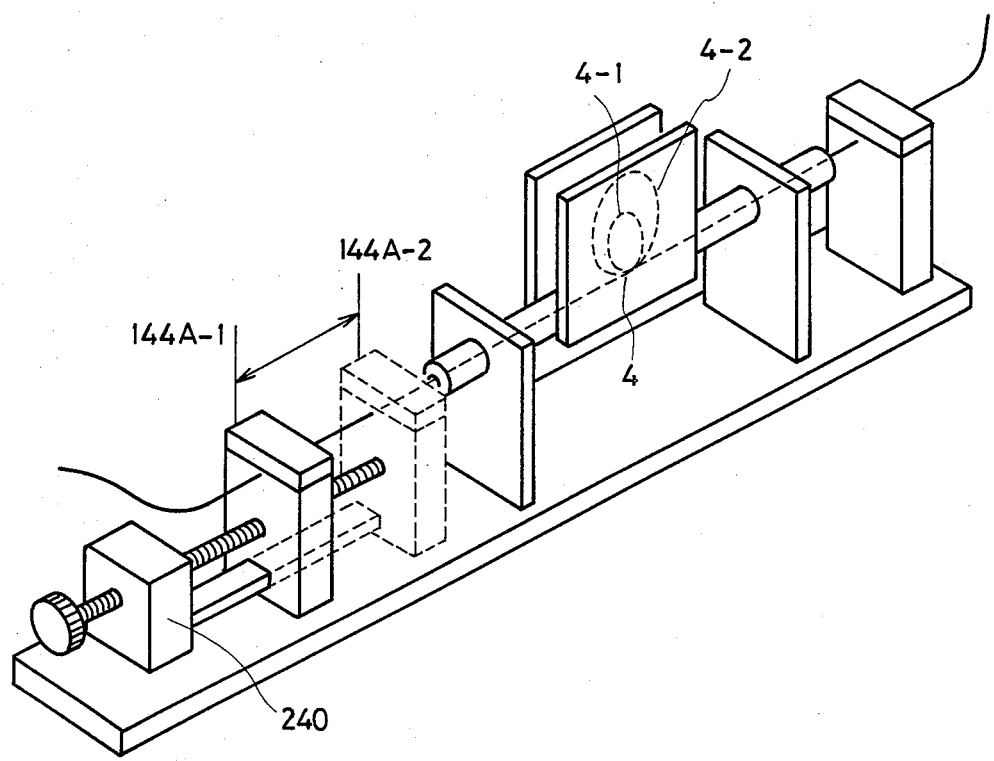
FIG. 24 is a perspective view to show the fourteenth embodiment of this invention's fiber optic polarization controller.

FIG. 24 is a perspective view of the fourth embodiment of this invention's fiber optic polarization controller wherein an adjuster 240 is provided in this embodiment to allow the movement of the fixing portion 144A of the seventh embodiment in the longitudinal direction of the optical fiber 1. The fixing portion 144A can move between the position 144A-1 furthermost from the curved portion 4 and the position 144A closest thereto. When the fixing portion 144A moves toward the position 144A-1, the curved portion 4 is pulled thereto to have a smaller curvature 4-1 while when the portion 144A moves toward the position 144A-2, the curved portion is relaxed to have a larger curvature 4-2. The birefringence caused on the curved portion 4 of the fiber 1 may be finely adjusted by the adjuster 240.

The seventh embodiment shown in FIG. 14 is modified in the eighth to the fourteenth embodiments. Such modifications can be given to the sixth embodiment shown in FIG. 12.

Figure 25:
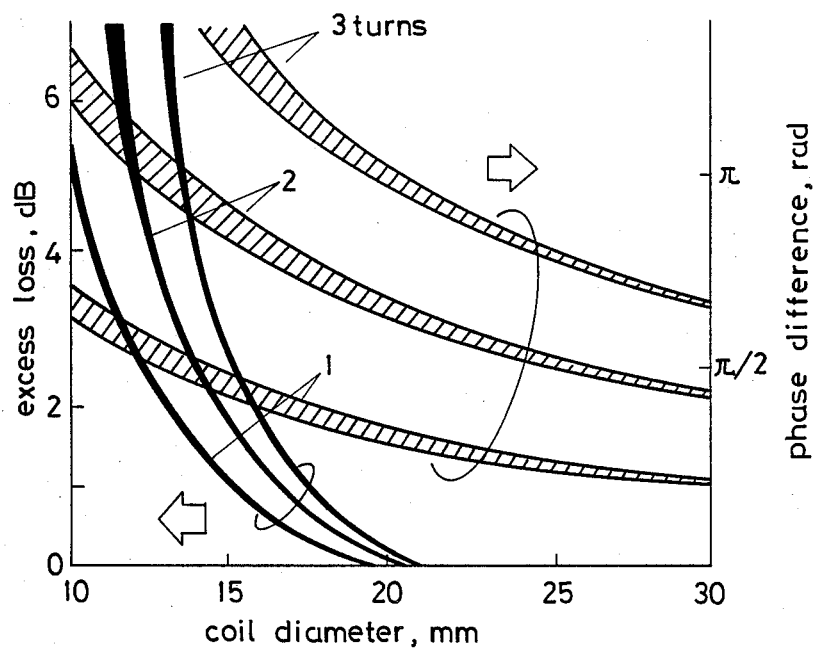
FIG. 25 is a graph to show the result of an experiment conducted to obtain the relation between the excess loss and the phase difference caused by the curvature of the optical fiber.

FIG. 25 shows experimentally obtained excess loss and phase difference of orthogonally polarised modes at an end facet of a single-mode fiber bent into a coil. The fiber was 125 μm in diameter with a cutoff wavelength of 1.41 μm and a relative index difference of 0.27%. It was silicone-coated with an outer diameter of 400 μm, and the wavelength as 1.52 μm. FIG. 25 indicates that to reduce excess loss below 0.1 dB, half-wave and quarter-wave devices should be constructed as follows: (i) half-wave device: three-turn coil with a diameter of 21 mm; (ii) quarter-wave device: two-turn coil with a diameter of 27 mm.

To verify characteristics of the fractional-wave devices, a half-wave device was constructed using the method shown in FIGS. 14 and 15, and a quarter-wave device in FIG. 5. In the half-wave device, a three-turn fiber coil was made of the above-mentioned single-mode fiber. The coil was inserted between two parallel aluminum plates with 3 mm spacing. Spacers between the two plates maintained the shape of the fiber coil therein. In the quarter-wave device, gears with a module of 0.75 and 37 teeth were used. Total fiber length in the frame was 63.4 cm. The fiber pigtails in each device were nearly 30 cm in length, and were fixed in linear positions by external fiber holders.

Figure 26:
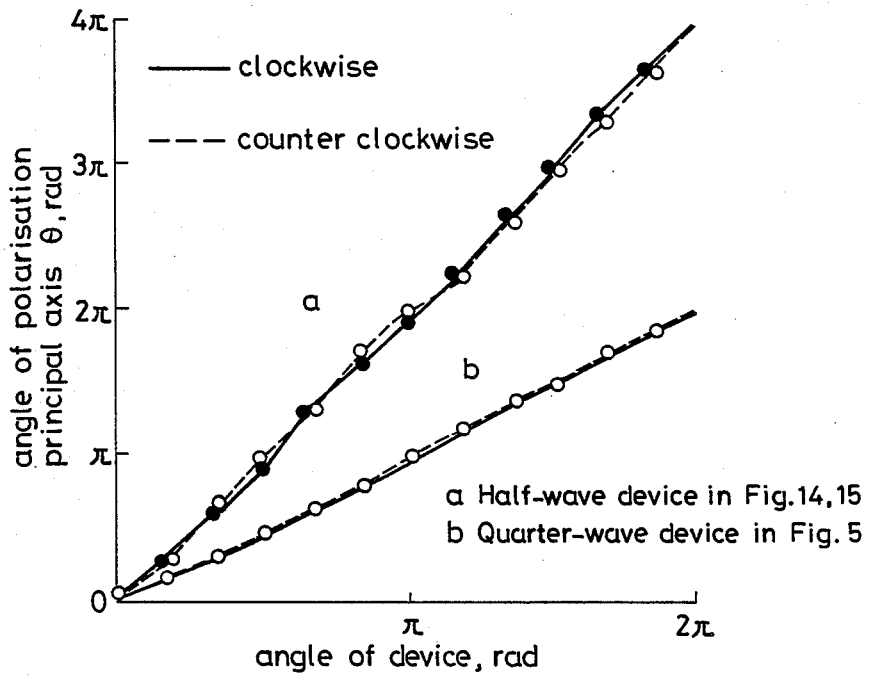
FIG. 26 is a graph to show the result of a measurement of the relation between the angle of polarization principle axis of output light and the angle of plane S.
Figure 27:
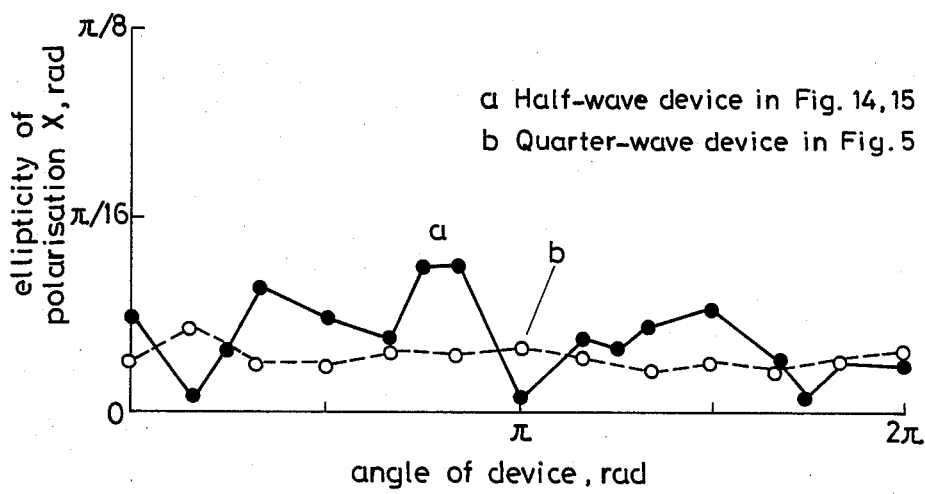
FIG. 27 is a graph to show the relation between the angle of the plane S and the ellipticity of polarization of output light.

Rotating the devices many times confirmed that the devices are free from fiber twist and, thus, are endlessly rotatable. Polarization characteristics of the devices are shown in FIGS. 26 and 27. In the measurement, input polarization was set to be linear for the half-wave device, and circular for the quarterwave device. The devices were rotated clockwise by 360°, then counter-clockwise by 360°. Rotation angle 8 of a principal axis of output polarization ellipse changed linearly as shown in FIG. 26. In the change of the rotation direction of the device, hysteresis was observed to be very small in each device. Ellipticity X of the output polarization, which is shown in FIG. 27 indicates that the fractional-wave devices were constructed within an accuracy of ±10%.

The two devices were combined and used as a polarization controller in a 400 Mbit/s optical FSK transmission experiment over a 251 km single-mode fiber The experiment confirmed that the devices have stable characteristics and are available to follow a continuous polarization rotation in a single-mode fiber.

Figure 28:
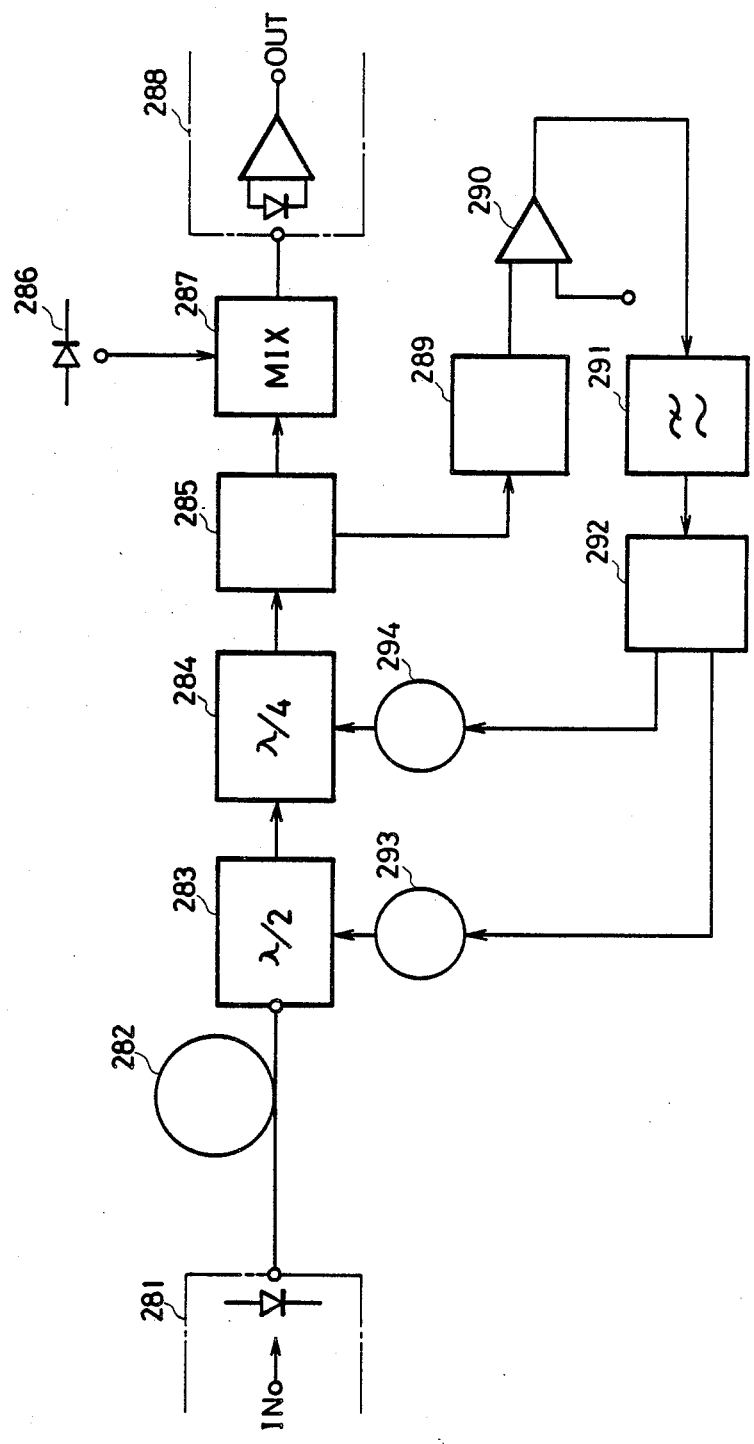
FIG. 28 is a block diagram of an application of this invention.

FIG. 28 shows an application of this invention. In this embodiment, this invention's fiber optic polarization controller is applied to a coherent optical communication equipment. A polarization controller is required on the side of receiver in coherent optical communication equipments as the polarization of the light propagating through the optical fiber should coincide with the polarization of locally oscillated light from the transmitter side.

An optical transmitter 281 transmits polarized light which has been phase-modulated and frequency-modulated or amplitude-modulated. The polarized light propagates through an optical fiber 282 to be controlled in polarization with λ/2 polarization controller 283 and λ/4 polarization controller 284 and passed through a directional coupler 285 The locally oscillated light from a luminous element is mixed by an optical mixer and inputted at a light receiving element 288. The λ/2 polarization controller 283 and λ/4 polarization controller 283 are this invention's fiber optic polarization controllers.

The directional coupler 285 branches the output light from the λ/4 polarization controller 284 to feed it to a polarization detector 289. The output from the polarization detector 289 is supplied to a rotator 292 via an amplifier 290 and a low pass filter 291. The rotator 292 is connected to motors 293, 294, which rotate curved portions of the optical fibers in the λ/2 polarization controller 283 and the λ/4 polarization controller 284 respectively The optical fiber 282 is a single mode optical fiber. Linear polarized light is fed from the optical transmitter 281 to the optical fiber. Due to external disturbance such as temperature fluctuation or distortion of the optical fiber per se, elliptically polarized light the principal axis of which changes may be outputted from the optical fiber 282. In such a case, the major axis of the elliptical polarization is automatically rotated in a desired direction with the λ/2 polarization controller 293 and then the elliptical polarization is transformed into linear polarization by the λ/4 polarization controller. By such a control, optimally polarized light can be inputted at the receiving element 288.

The polarization is loop-controlled by the λ/2 polarization controllers 283 and the λ/4 polarization controller 284 by feeding back the output of the λ/4 polarization controller 284 and rotating the curved portions of the optical fibers within the controllers mechanically by motors 293, 294. As the period of rotation of polarization is experimentally learned to be several hundred mm/sec. or more, the mechanical rotation of the optical fiber according to this invention would be sufficient to follow the variations in control.

What is claimed is:

1. A fiber optic polarization controller comprising
   an optical fiber having a curved portion, for generating birefringence within the fiber
   means for fixing said optical fiber at two positions on both sides of said curved portion,
   means for loosely holding said curved portion on a plane to allow for rotation of said optical fiber without accumulating twists on said optical fiber, and
   rotating means to rotate said holding means and therefore said curved portion of said optical fiber around an axis extending between said two positions so that said polarization is controlled.

2. The fiber optic polarization controller of claim 1 wherein said holding means includes tubes through which said optical fiber is loosely held.

3. The fiber optic polarization controller of claim 1 wherein said holding means includes side plates which loosely hold said curved portion from both sides.

4. The fiber optic polarization controller of claim 1 wherein said fixing means includes a means which finely adjusts birefringence by changing said curvature of said curved portion to thereby changes said birefringence of said optical fiber.

5. The fiber optic polarization controller of claim 1 wherein said optical fiber is coated with a coating for reducing friction against said holding means as well as for protecting said optical fiber.

6. The fiber optic a polarization controller of claim 1 wherein said rotating means is an electric motor.

7. The fiber optic polarization controller of claim 6 wherein said electric motor is controlled by monitoring output light from said optical fiber.

8. A fiber optical polarization controller of claim 1 wherein:

said optical fiber has at least two of said curved portions connected in cascade, each curved portion having a different shape; and said means for loosely holding can loosely hold each of said at least two curved portions.

9. The fiber optic polarization controller of claim 8 wherein each of said at least two curved portions have a number of windings and said number of windings in each of in each of said at least two curved portions is different from each other.

10. The fiber optic polarization controller of claim 8 or 9 wherein said curved portions of two controllers have different curvatures.

11. The fiber optic polarization controller of claim 1 wherein said curved portions make up at least one winding.

12. The fiber optic polarization controller of claim 2 wherein said holding means includes a means to rotate said tube to cause said curved portion from said plane around said axis thereof in a direction to not accumulate twist on said optical fiber which has been caused by rotation.

13. The fiber optic polarization controller of claim 12 wherein said holding means includes a means to finely adjust birefringence by varying the curvature of said curved portion.

* * * * *